Oct. 9, 1934.    D. P. GRAHAM    1,975,937
METHOD OF AND APPARATUS FOR REGULATING THE VISCOSITY OF LIQUIDS
Filed Oct. 1, 1929
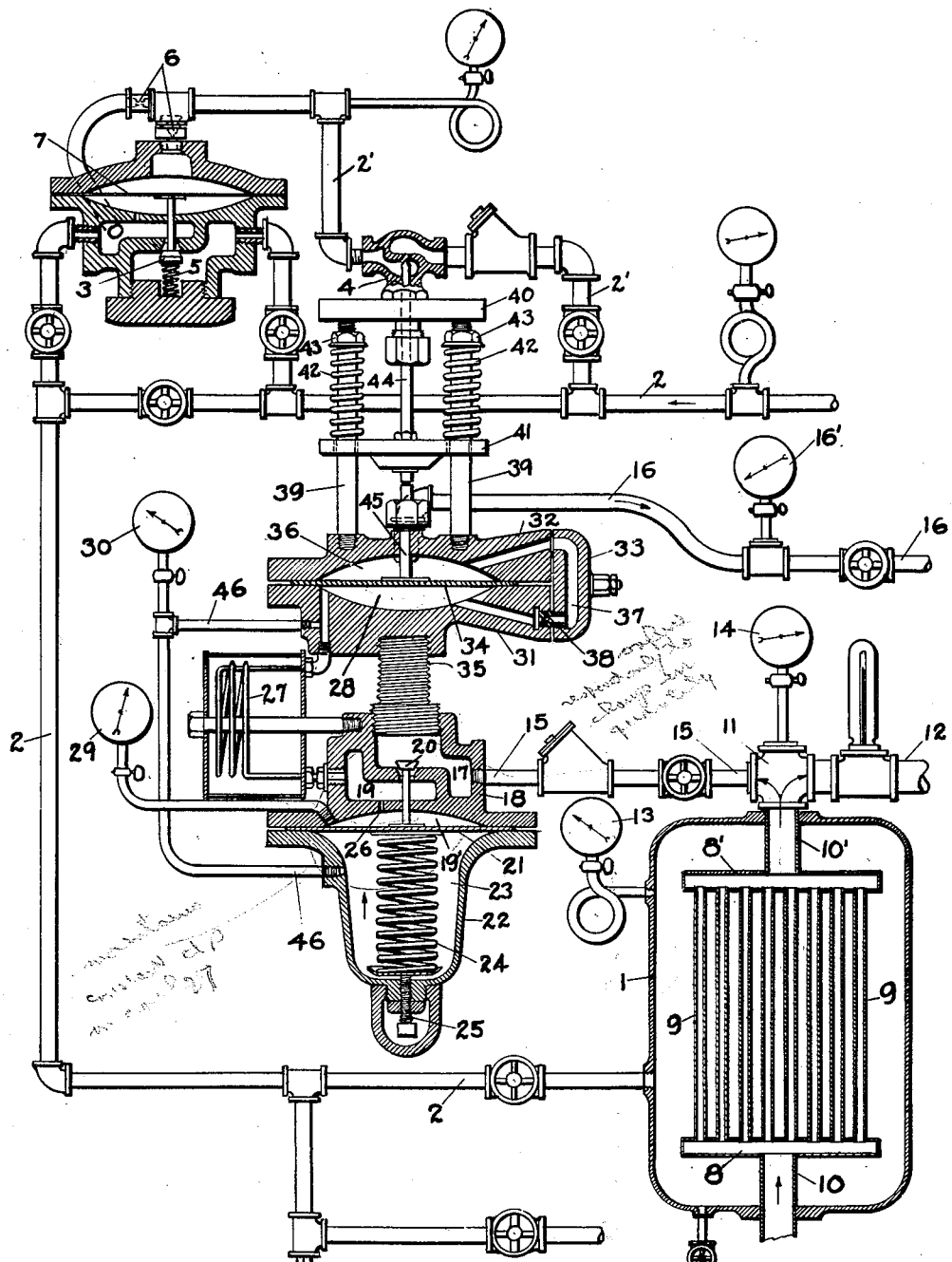
INVENTOR.
David P. Graham
BY Meyers Jones
ATTORNEYS.

Patented Oct. 9, 1934

1,975,937

UNITED STATES PATENT OFFICE 1,975,937

METHOD OF AND APPARATUS FOR REGULATING THE VISCOSITY OF LIQUIDS

David P. Graham, New York, N. Y., assignor to Peabody Engineering Corporation, New York, N. Y., a corporation of New York Application October 1, 1929, Serial No. 396,582

15 Claims. (Cl. 137—78)

The object of the present invention is to maintain a given liquid at an approximately constant viscosity, determined by the nature of the liquid and the purpose for which it is to be used. Generally stated, the invention contemplates the automatic adjustment of the quantity of heating medium supplied to the liquid upon any substantial change in its viscosity above or below a predetermined value.

The invention is capable of use in various industrial operations. Practical application has been made of it in oil-burning systems in which the factor of a substantially constant viscosity of the oil is essential to efficient operation.

In the following description, it will be assumed that fuel oil is the liquid to be handled. No substantial change, however, would be required either in the apparatus or in its mode of operation, should it be desired to adapt the apparatus to conditions obtaining in the handling of other viscous liquids.

The accompanying drawing illustrates, more or less diagrammatically, the general layout of an apparatus which may be employed in the practice of the invention. In this drawing the numeral 1 designates a heater to which steam is admitted from the main supply line 2 under the control of valve 3. The latter is controlled by a pilot valve 4, in a branch 2' from the main supply line. The valve 3 is normally closed by a spring 5. A steam orifice 6 is located between the two sides of the diaphragm 7, to which diaphragm the stem of valve 3 is attached, to synchronize the movements of the main valve with that of the pilot valve. The control of a valve of the type of valve 3 by a pilot valve is well known and has been included as part of the present unit because of its adaptability to the system.

Within the heater casing is any suitable arrangement of piping through which the oil is caused to flow. That shown comprises headers 8 and 8', connected by pipes 9. The oil inlet 10 is connected to the lower header, and the outlet 10' is connected to the upper header. A connection is made thereto through a fitting 11 by a pipe 12 through which the oil is delivered to the burners.

The inlet 10 is connected to a pump or other source from which the oil may be delivered under variable or constant pressure. The heater is equipped with a steam pressure gage 13, and the fitting 11 with an oil pressure-gage 14.

As will be hereinafter more fully explained, the several parts of the regulator are initially adjusted to supply the oil to the burners at a predetermined viscosity. Should there occur any substantial change in the viscosity from any cause whatever, the parts now to be described will function to increase or decrease the quantity of steam to the heater as the changed condition requires.

Leading from the fitting 11 is a pipe 15 through which a portion of the oil from the heater is withdrawn under the same pressure as that under which it leaves the heater for the burners. As the quantity withdrawn is small compared with that supplied to the burners, it may be conveniently disposed of by returning it, after it leaves the regulator, through a valved pipe 16 to the storage tank, or it may be otherwise disposed of as desired.

The return line is provided with a suitable gage 16'.

The pipe 15 is connected to the inlet chamber 17 in the upper part 18 of the casing of a differential valve. The wall dividing the inlet chamber from the outlet chamber 19 is formed with a seat for a valve 20. The stem of said valve is attached to a flexible diaphragm 21 clamped at its periphery between the upper and lower sections 18 and 22 of the casing.

In the lower part 22 of the casing, suitably supported, is a spring 24 bearing against the underside of diaphragm 21. The compression of said spring is effected by a screw-bolt 25 which extends through the lower end of the casing and engages the lower support of the spring. By adjusting the screw-bolt, the pressure upon the underside of diaphragm 21 may be varied. Upon its upper side the said diaphragm is subjected to the pressure of the oil in the outlet chamber 19, the oil being admitted from said chamber through an opening 26.

Connected to the outlet chamber 19 is a device sensitive to viscosity. In the form shown this consists of a short coil 27 of small bore tubing the outlet of which leads to a chamber 28, in a member which directly controls the extent of opening of pilot valve 4. A gage 29 connected to chamber 19, registers the pressure of the oil at the inlet of coil 27, and a gage 30 connected to chamber 28 registers the pressure at the outlet end of the coil. It may be stated here that whatever the pressure or viscosity of the oil, the function of the differential valve 20 is to maintain a substantially constant difference in pressure between the inlet and outlet of coil 27.

The member of the regulator to which the pilot valve 4 is connected comprises a casing shown as made up of the sections 31, 32 and 33, with a flexible diaphragm 34 clamped at its periphery between the sections 31 and 32. This casing may be conveniently supported upon a stud 35, screwed into an opening in the upper part of the casing 18.

The upper section 32 of the pilot valve control casing is formed with a chamber 36 and all of the sections are formed with ducts so arranged that when the sections are assembled there will be provided a passage 37, leading from chamber 28 on the lower side of diaphragm 34 to chamber 36 on the upper side thereof. In the passage 37 is a restricted orifice 38 which may be of any suitable form, as a plate with an opening therein, a Venturi tube or similar device. The oil return line 16 leads from chamber 36.

Secured to the upper section 32 are rods 39, which support a fixed cross-member 40, and carry a movable yoke 41. Surrounding the rods and exerting a downward pressure against the yoke, are springs 42. The pressure may be varied by nuts 43 threaded on the upper ends of the rods.

Attached to yoke 41 and extending above the same is the upper section 44 of the stem of pilot valve 4. The lower section 45 of the valve stem is attached to diaphragm 34, and at its upper end bears firmly against the lower end of section 44. Thus, as the diaphragm rises, the valve 4 will be more or less closed against the pressure of springs 42.

A pipe 46 connects chamber 28 below diaphragm 34 with chamber 23 below diaphragm 21. The oil pressure on the underside of diaphragm 34 is that of the outlet of the viscosity coil 27, and as this pressure is transmitted to the underside of diaphragm 21 it follows that whatever the pressure or viscosity of the oil flowing through pipe 15, the movement of valve 20 will maintain a constant difference in pressure across the viscosity coil.

In operation the regulator is initially set to admit to the heater the quantity of steam required to give a desired viscosity of the oil. This initial setting is effected by adjusting the position of valve 20 by means of spring 24 and screw-bolt 25 until the difference in pressure across coil 27 reaches a predetermined amount. The drop in pressure across said coil is due to the resistance offered to the flow of the oil therethrough, and is indicated by the readings on the gages 29 and 30. At the desired or predetermined viscosity, a given quantity of oil will be discharged through coil 27 into chamber 28 of the pilot valve control, and such oil will be forced through the restricted orifice 38. The drop in pressure across said orifice is effective in the movement of diaphragm 34 which operates the stem of pilot valve 4. By adjusting the nuts 43 against springs 42 the pilot valve will be positioned to admit a given quantity of steam to operate the main steam supply valve, and thereby admit to the heater the required quantity of steam for the required or predetermined viscosity.

The initial adjustment of valves 3 and 4 will be maintained so long as the viscosity of the oil remains substantially that desired. Should the viscosity of the oil flowing through the heater increase, then the regulator will automatically further open valves 4 and 3 to increase the quantity of steam to the heater, and such increase will continue until the viscosity is reduced to substantially the predetermined amount when the valves 4 and 3 will automatically be restored to practically their original positions. On the other hand, should the viscosity fall below the predetermined amount, the valves 4 and 3 will be partly or wholly closed, thus reducing or cutting off entirely the supply of steam to the heater to prevent any further lowering of the viscosity. This condition will continue until there is a rise in the viscosity to substantially the predetermined amount, when the several valves will automatically be restored to practically their initially set positions.

The movements of pilot valve 4 to vary the quantity of steam supplied to the heater above or below the predetermined amount are effected as follows:

Assume a given pressure of the oil flowing from the heater of 250 lbs. per square inch, a desired viscosity of 180 Saybolt seconds universal, and a difference in pressure of 35 lbs. per square inch between the inlet and outlet of coil 27. Under these conditions the valves 20, 4 and 3 will be maintained in their initially-set positions for the given viscosity. If the viscosity rises, for example, to 190 Saybolt seconds universal then when the viscosity changes the quantity of oil flowing through coil 27 will change. That is, the higher the viscosity, the less will be the quantity of oil flowing, and the lower the viscosity, the greater will be the quantity flowing. This is expressed by the statement that coil 27 is sensitive to viscosity.

Under the assumption of a rise in viscosity less oil will flow through the coil 27 than when the viscosity was at 180 Saybolt seconds universal, and consequently less oil will be delivered into chamber 28 below diaphragm 34.

The pressure required to force oil through the restricted orifice 38 is in proportion to the quantity and independent of the viscosity. Thus the decrease in quantity will be indicated by the difference in pressure across the orifice, and the reduced pressure on the underside of diaphragm 34 will result in a further opening of valve 4 by springs 42. This will effect the opening of valve 3 further than its initial position and an increase in the steam supply to the heater.

As the viscosity is lowered upon the admission of a greater quantity of steam to the heater, an increase in the amount of oil flowing through coil 27 and delivered to chamber 28 will follow, thus increasing the pressure below diaphragm 34 to effect the restoration of valve 4 to practically its initial position, which will be reached when the viscosity is reduced to substantially the predetermined amount of 180 Saybolt seconds, the slight variation therefrom being the factor of control.

When the viscosity falls below that for which the regulator is initially set there will be an increase in the flow of oil through coil 27, and in the quantity delivered to chamber 28, resulting in an increased pressure drop across orifice 38, which will flex diaphragm 34 upward to effect a partial or complete closing of valve 4 and a synchronous movement of the main supply valve 3. This will reduce or completely shut off the supply of steam to the heater, and this condition will continue until a rise in the viscosity will effect a re-opening of the valves to give an increased supply of steam.

Notwithstanding a change in viscosity, the difference in pressure between the inlet and outlet of coil 27 will remain practically constant. The only condition which will effect a movement of valve 20 is a change in the pressure at the outlet of coil 27. If the pressure of the oil increases above that by which the initial opening of valve 20 is determined, there will be an increase in pressure both at the inlet and outlet of coil 27, but the difference in pressure across the coil will not vary from the initial difference, except the very small amount constituting the factor of control.

Any variation in the pressure of the outlet of coil 27 will be transmitted through pipe 46 to the underside of diaphragm 21. Thus an increase in pressure will result in a further opening of valve 20 to thereby admit more oil through the valve to maintain the initial difference in pressure across the viscosity coil. Upon a decrease in pressure at the outlet of coil 27 there will be a decrease in the pressure against the underside of diaphragm 21, with a corresponding closing of valve 20. By reason of the relation between the differential valve 20, coil 27, and the connecting pipe 46 leading from the pilot valve control device, the difference in pressure across coil 27 will remain practically constant irrespective of variations in the pressure of the oil delivered to valve 20.

The operation of the regulator may be summarized as follows:—

With a constant pressure drop across coil 27 the rate of flow of the oil through said coil, and the quantity delivered to chamber 28 of the pilot valve control, will vary with the viscosity of the oil. As the restricted orifice 38 is not sensitive to viscosity, but only to quantity, it follows that any change in the rate of flow effected by coil 27 will result in a difference in pressure drop across said orifice for varying rates of flow.

It is the pressure drop across orifice 38 which determines the extent of opening of pilot valve 4 and therefore the quantity of steam admitted to the heater. The higher the viscosity the smaller the quantity flowing and less pressure required to force the oil through orifice 38, and consequently less pressure on the underside of diaphragm 34, which will therefore be moved downward by springs 42 to open valve 4. As the viscosity drops because of the increased supply of steam, more oil will flow through coil 27, thereby increasing the quantity to be forced through orifice 38, resulting in an increase in pressure on the underside of diaphragm 34, forcing said diaphragm upward, and reducing the opening of the pilot valve to reduce the supply of steam to the heater.

In brief, the present regulator functions to convert viscosity into quantity, and then to convert quantity into pressure at the restricted orifice 38, so that the resultant difference or drop in pressure across the orifice, due to varying quantities or rates of flow below diaphragm 34, will control the position of pilot valve 4.

I claim:

1. The method of controlling the viscosity of a liquid which consists in passing it through a device sensitive to viscosity, maintaining a substantially constant drop in pressure across said device, and utilizing variations in the rate of flow of the liquid to control the viscosity.

2. The method of controlling the viscosity of a liquid, which consists in heating a liquid, passing it through a device sensitive to viscosity, mantaining a substantially constant pressure difference across said device irrespective of changes in viscosity, and then passing the liquid through a device wherein variations in the rate of flow is caused to vary the amount of the heating medium.

3. The method of controlling the viscosity of a liquid which consists in heating the liquid, passing it through a device sensitive to viscosity, maintaining a constant pressure drop across said device irrespective of changes in viscosity, and then passing the liquid through a device responsive only to variations in the rate of flow of the liquid and utilizing variations in the rate of flow to vary the amount of the heating medium.

4. In a viscosity regulator, the combination of a heater for the liquid, means for supplying a heating medium thereto, a device sensitive to viscosity through which the liquid is caused to flow, means to maintain a substantially constant pressure drop across said device irrespective of the viscosity and pressure of the liquid, and means operative upon a change in the rate of flow of the liquid, due to changes in viscosity, to vary the amount of heating medium.

5. In a viscosity regulator, the combination of a heater for the liquid, means for supplying a heating medium thereto, a device sensitive to viscosity through which the liquid is caused to flow, means responsive to variations in the viscosity and pressure of the liquid to maintain a substantially constant pressure drop across said device, and means responsive to changes in the rate of flow of the liquid from said device to adjust the quantity of heating medium upon any substantial change in its viscosity from a predetermined value.

6. A viscosity regulator including means for regulating the viscosity of a liquid by controlling the heating of said liquid, sad regulator having viscosity-senstive means provided with an outlet, and including devices to take into account changes in the pressure of the liquid whose viscosity is to be regulated after such liquid has passed the regulator outlet and prevent such changes in pressure of the liquid after passing the regulator outlet from bringing about an undesired viscosity regulation.

7. A viscosity regulator comprising a liquid heater, a viscosity change sensing device, means for controlling the supply of heating medium to said heater under the control of said sensing device, said sensing device including means to prevent pressure changes of liquid leaving the sensing device, with unchanged viscosity of the liquid, from effecting modifying control of the means for controlling the supply of heating medium and thereby bringing about an undesired change in viscosity of the liquid which flows through the heater.

8. The method of viscosity regulation of a liquid including the controlling of heat exchange with the liquid in accordance with changes in viscosity of the liquid which is to be regulated as to viscosity, comprising the steps of obtaining variations in the rate of flow of the liquid in accordance with viscosity changes while nullifying the effects of variations of back pressure of the liquid whose rate of flow has been previously varied, and in measuring the variations in flow and in controlling heat exchange in accordance with such measuring.

9. The method of viscosity regulation including the effecting of variation of heat exchange upon a liquid medium by producing changes in the rate of flow of the liquid in accordance with viscosity changes thereof, measuring such changes in rate of flow and controlling heat exchange in accordance with such measurement, including the step of preventing changes in the back pressure of the liquid after measurement from affecting undesired viscosity regulation.

10. The method of controlling the viscosity of a liquid which comprises effecting heat exchange with the liquid, passing a portion of the liquid through a device which will give a rate of flow varying with the viscosity and which rate of flow will be wholly independent of and unaffected by changes in the pressure of the liquid leaving said device and in regulating heat exchange by variations in the rate of flow.

11. The method of controlling the viscosity of a liquid which comprises effecting heat exchange with a liquid, passing it through a device wherein a rate of flow is produced which varies only with the viscosity and which rate of flow is independent of and unaffected by the variations in the pressure of the liquid leaving the device, and causing any variations in a rate of flow to vary the heat exchange with the liquid.

12. A viscosity regulator for controlling a heat exchanger and for controlling the viscosity of a liquid passed therethrough, said viscosity regulator comprising a viscosity sensing device to produce changes in rate of flow of a liquid according to changes in viscosity, a device for measuring such changes in rate of flow and for controlling the heat exchanger, and means responsive to variations in back pressure of liquid leaving the measuring device and including devices for making such back pressure changes ineffective for control of the heat exchanger.

13. In a viscosity regulator, the combination of a heat exchanger for a liquid, means for controlling the heat exchanging action thereof, said controlling means comprising one device which acts to produce changes in rate of flow of the liquid in accordance with changes in viscosity, and another device which is unaffected by the viscosity of the liquid to measure such changes and to effect the control of the heat exchanger, said viscosity regulator being adapted for effecting viscosity regulation in a system in which changes of pressure of the liquid leaving the devices may occur, and both of said devices including pressure-responsive means for nullifying the effect of such pressure variations in effecting control of the heat exchanger.

14. In a viscosity regulator, the combination of a heat exchanger for the liquid, means for controlling the heat exchanging action thereof, comprising mechanism responsive only to the quantity of a liquid flowing through said mechanism and in accordance with the viscosity of the liquid, said mechanism including pressure-responsive devices for preventing variations in back pressure of the liquid finally leaving said mechanism for modifying the viscosity-responsive controlling operation of said mechanism on the heat exchanger.

15. In a viscosity regulator, the combination of a heat exchanger for a liquid, means for controlling the heat exchanging action thereof to regulate the viscosity of the liquid, comprising a viscosity sensing device for causing changes in the viscosity of the liquid flowing therethrough to be represented by changes in the rate of flow of the liquid flowing through the sensing devices, and another device which is not affected by the viscosity of the liquid flowing therethrough but which includes means for measuring the changes in rate of flow of the liquid produced by the aforesaid device, said last mentioned device including means for controlling the heat exchanger, said viscosity regulator being adapted for use in a system wherein variations may occur in back pressure of the liquid whose rate of flow has been changed in accordance with viscosity changes, and said regulator including devices for preventing such changes in back pressure from effecting a modifying control upon the control of the heat exchanger by the aforesaid viscosity-sensing and flow-measuring devices.

DAVID P. GRAHAM.

---

CERTIFICATE OF CORRECTION.

Patent No. 1,975,937.    October 9, 1934.

DAVID P. GRAHAM.

It is hereby certified that error appears in the printed specification of the above numbered patent requiring correction as follows: Page 3, line 106, claim 6, for the word "sad" read said; and page 4, line 88, claim 14, for the word "for" read from; and that the said Letters Patent should be read with these corrections therein that the same may conform to the record of the case in the Patent Office.

Signed and sealed this 30th day of October, A. D. 1934.

(Seal)

Leslie Frazer
Acting Commissioner of Patents.